Jan. 30, 1968     E. E. SCOTT     3,366,809
EXTENDED-STROKE RECIPROCATING MOTOR
Filed Aug. 3, 1964     2 Sheets-Sheet 1
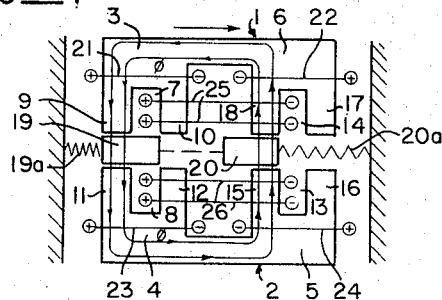
FIG—1
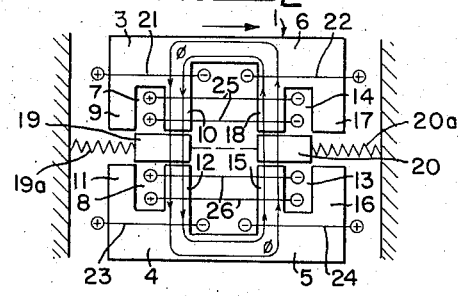
FIG—2
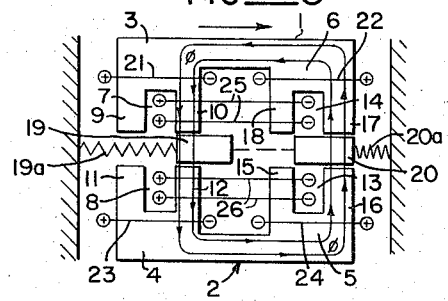
FIG—3
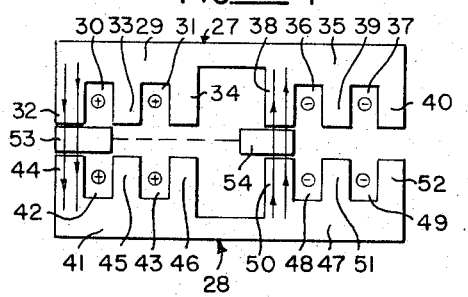
FIG—4
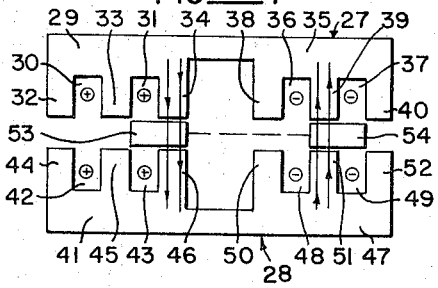
FIG—7
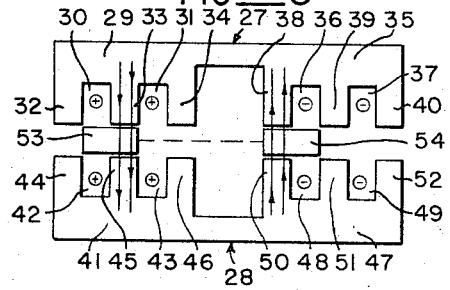
FIG—5
FIG—8
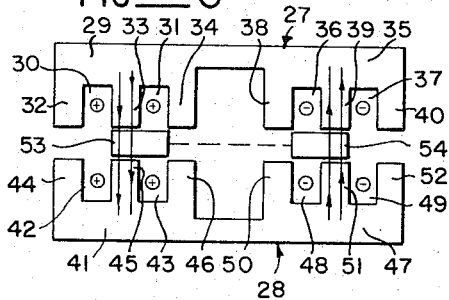
FIG—6
ELMER E. SCOTT
*INVENTOR.*
BY *Sead & Berry*
ATTORNEYS Jan. 30, 1968  E. E. SCOTT  3,366,809
EXTENDED-STROKE RECIPROCATING MOTOR
Filed Aug. 3, 1964  2 Sheets-Sheet 2
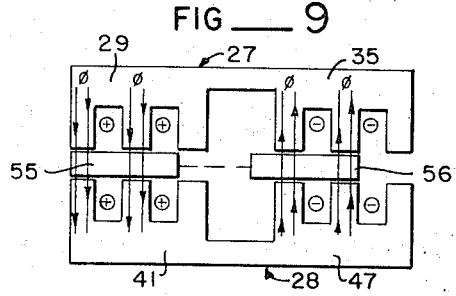
FIG__9
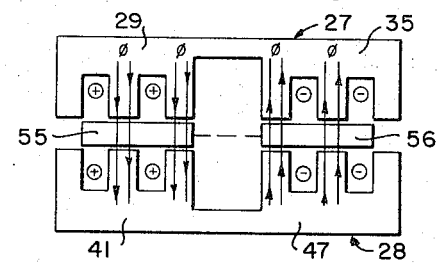
FIG__10
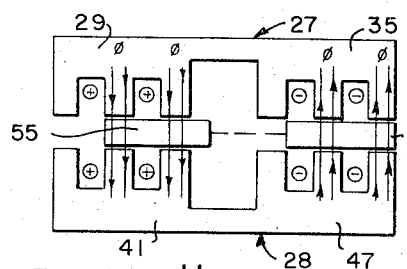
FIG__11
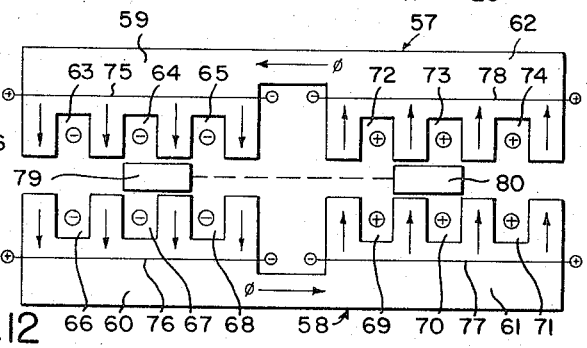
FIG__12
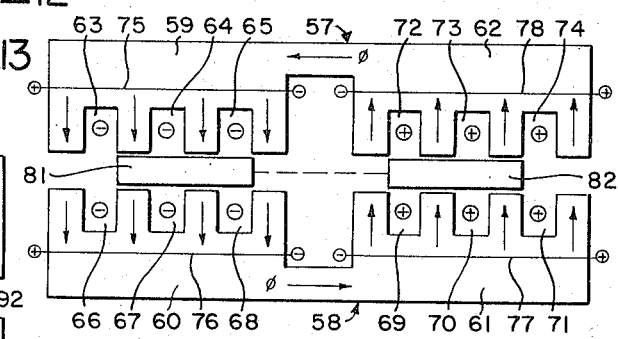
FIG__13
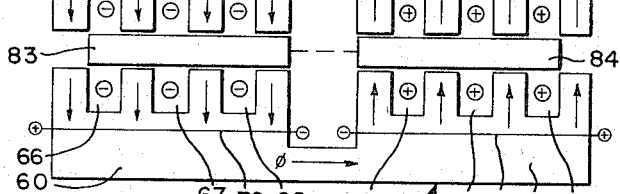
FIG__14
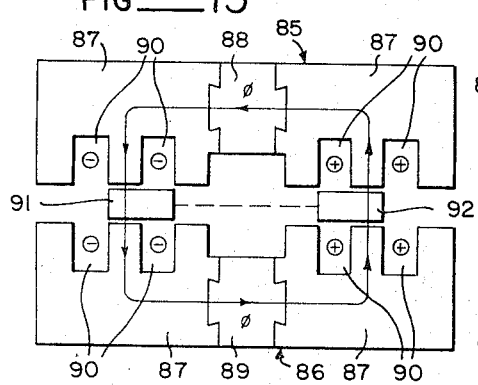
FIG__15
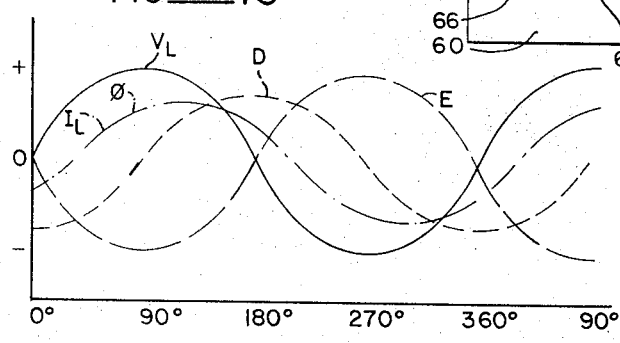
FIG__16
ELMER E. SCOTT
INVENTOR.
BY  Seed & Berry
ATTORNEYS 3,366,809
EXTENDED-STROKE RECIPROCATING MOTOR
Elmer E. Scott, 6602 Olympic Highway,
Aberdeen, Wash. 98520
Filed Aug. 3, 1964, Ser. No. 387,145
9 Claims. (Cl. 310—15)

The present invention relates in general to electrical motors and more particularly to an improved electrical motor for attaining direct linear oscillating motion with thrust being produced in either direction without the use of complicated mechanical conversions. The present invention relates more specifically to an oscillating motor of the character described which makes possible an efficient unit for producing uniform power strokes of a length hitherto unattainable. According to the concepts of the present invention, a uniform power stroke in both directions in the neighborhood of 1 inch and upwards to theoreticaly unlimited values may be obtained.

Various types of prior art motors have been devised for obtaining oscillatory motion but all such forms have been seriously limited in that only very short strokes have been possible and only extremely small horse power output per pound of material has been possible. Where larger horse power output is required, the rotating electric motor has been recognized as the logical motive power but necessitates some form of transmission gears, cams, eccentrics or other conversion equipment to change rotation to oscillation for use at the point of power utilization. Even in the larger forms of vibrating and oscillating motors the stroke is usually limited to about ⅜₆ inch with the devices being bulky and requiring extensive complex auxiliary equipment for their operation. For such applications as polishers requiring long strokes to obtain high surface velocities, lapping machines and compressors in which long strokes of several inches may be desirable, the prior art oscillating motors have proven to be inefficient and inadequate.

The present invention provides an oscillating motor capable of producing strokes of 1 inch and upwards for driving the types of devices mentioned and is inherently an alternating current device which has efficiency and power factor comparable to that of widely used rotating equipment such as induction and universal motors. The invention contemplates a unique use of a unidirectional magnetic field and a constant air gap type of construction which is responsible for characteristics much improved over those of existing units and provides a new concept in attaining long stroke linear oscillating power in a practical manner. The present invention employs the combination of a magnetic field in conjunction with an energizing winding for producing thrust in either direction as it operates in synchronism with the power supply producing one complete oscillation for each cycle of power supply. The main, or energizing winding is a simple shunt winding connected directly across the alternating current power supply. The magnetic field may be established in any conventional means. It may be provided by a permanent magnet in which event no excitation power supply is required to maintain the field. The field may be established by an electro-magnet energized by either direct current or by rectified alternating current. In the latter case, the amount of energy required for excitation is relatively small ranging from about 1 to 5% of the total capacity of the unit. The excitation requirements vary with the size and type of unit and generally are comparable to those of rotating direct current apparatus. The inherently longer strokes provided by the present oscillating motor is attained by the unique geometrical configuration and spacing between the moving armature segments and a plurality of teeth located on opposed magnetic pole pieces which will be evident from the following specification. The invention also utilizes a novel form of flux transfer within pole pieces which is characterized as "alternate" flux transfer. The extended-stroke oscillating motor of the present invention operates on the same basic electro-magnetic principles as described in my co-pending application Ser. No. 386,836 entitled Oscillating Motor, filed Aug. 3, 1964, and hence reference is made to the co-pending application for a detailed description of the operating principles.

The primary object of the present invention is therefore to provide an oscillating motor with an inherently longer stroke than that provided by known prior art oscillating motors.

Another object of the present invention is to provide an alternating current motive means which produces an extended or long-stroke oscillating linear motion and develops thrust in either direction of operation and which operates in synchronism with the power supply producing one complete oscillation for each cycle of power supply as contrasted with existing devices which develop thrust in only one direction.

Another object of the present invention is to provide a motive means for producing extended stroke oscillating linear motion that develops thrust by utilizing forces exerted on current carrying conductors in the presence of a unidirectional magnetic field, but where the attractive forces between poles of unlike polarity are not utilized.

Another object of the present invention is to provide an oscillating motive means for producing oscillating linear motion of a certain maximum stroke, which stroke can be varied over a range of zero to maximum by adjusting the alternating current voltage applied to the energizing windings.

Another object of the present invention is to provide a long-stroke oscillating motor means that permits the main or energizing winding to be connected directly to a conventional alternating power supply without the need of interposed auxiliary devices of any form, in which contacts, controlled and/or uncontrolled interrupters, electronic tubes or semiconducting devices and their associated maintenance are no longer necessary.

Another object of the present invention is to provide a long stroke linear oscillating motor with all necessary electrical windings supported in the stator; with no windings on the armature, thus making flexible leads or moving contacts to the armature unnecessary.

Another object of the present invention is to provide a long-stroke oscillating motor in which the armature moves in a direction perpendicular to the axes of the stator pole pieces with the air gap between the stator pole pieces and armature poles remaining constant throughout the entire stroke, thus permitting a constant unidirectional magnetic flux in the magnetic circuit irrespective of the length of stroke.

Another object of the present invention is to provide a long-stroke oscillating motor in which the unidirectional magnetic flux is established by windings separate from the energizing windings and supplied with a unidirectional current to relieve the energizing winding from supplying the magnetic field which would add a highly lagging component of current to the energizing winding current required to do work.

Another object of the present invention is to provide a long-stroke oscillating motor in which the unidirectional magnetic field is furnished by permanent magnets, hence the separate excitation windings and direct current power supply are no longer necessary.

Another object of the present invention is to provide a long-stroke oscillating motive means which is inherently incapable of producing radio frequency interference of any form.

Another object of the present invention is to provide a long-stroke oscillating motor that takes a current of essentially sine wave form when energized from an alternating current power supply with sine wave form of commercial quality.

A further important object of the present invention is to provide a long-stroke oscillating motor with efficiency, power factor and line current that are comparable to those of rotating motors such as induction and universal motors of comparable size.

A further object of the present invention is to provide a long-stroke oscillating motive means which not only serves to convert electrical energy into oscillating linear motion, but also serves to convert oscillating linear motion into electrical energy, thus serving as an oscillating generator as well as a motor. As an oscillating generator, the device, when driven mechanically from an oscillating source, will generate one cycle of alternating current for each complete oscillation of the armature.

A further object of the invention is to provide a long-stroke oscillating motor, the embodiments of which are not only suitable for operation on full wave alternating current, but also all forms of which are adaptable, with modification of the energizing winding and the use of a bi-phase half wave (2 element) inverter, to operation on direct current power supplies.

A still further object of the present invention is to provide a long-stroke oscillating motor which utilizes multiple armature segments and multiple pole pieces with each pole piece being formed with a plurality of teeth and wherein flux transfer occurs "alternately" within the teeth of the respective pole pieces.

The means by which the foregoing objects and other advantages, which will be apparent to those skilled in the art, are accomplished as set forth in the following specification and claims, and are illustrated in the accompanying drawings.

Reference is now made to the accompanying drawings in which:

FIGS. 1-3 illustrate a first form of the invention diagrammatically in three different positions of movement;

FIGS. 4-8 illustrate a second form of the invention diagrammatically in five different positions of movement;

FIGS. 9-11 illustrate a third form of the invention diagrammatically in three different positions of movement;

FIG. 12 illustrates a fourth form of the invention;

FIG. 13 illustrates a fifth form of the invention;

FIG. 14 illustrates a sixth form of the invention;

FIG. 15 illustrates a seventh form of the invention and;

FIG. 16 represents a graph of the phase relationship of the significant characteristics of the electric motors of the present invention.

The first form of the long-stroke oscillating motor of the present invention is shown in FIGS. 1, 2 and 3 with only the arrangements of the electro-magnetic means being shown schematically since the materials utilized and the exact details of form may be widely varied. It will also be understood that appropriate guide means and stator support structure will be provided in practice to accurately align the armature assembly with respect to the pole pieces throughout the required stroke to be presently described.

The first form of the oscillating motor is shown in three views, FIGS. 1 through 3 for the purpose of illustrating the positions of the armature segments with respect to the stator during one complete stroke of the motor. Since the different parts of the motor are identical in FIGS. 1 through 3, identical reference numerals are used to indicate the identical parts. The stationary portion of the motor comprises the stator pieces 1 and 2 which may be constructed from any suitable magnetic material and are of a U-shape configuration forming opposing pole pieces 3 and 4, and 5 and 6. Any desirable structure may be utilized for mounting the stator pieces in the opposing relation as shown in FIGS. 1 through 3 with the opposing pole pieces being spaced as indicated. The pole pieces 3 and 4 are provided with slots 7 and 8 respectively with the slot 7 forming spaced teeth 9 and 10 on the pole piece 3 and the slot 8 forming teeth 11 and 12 on the pole piece 4. It will also be noted that the teeth 9 and 10 are of equal width and are aligned with the teeth 11 and 12 respectively. In a like manner, pole pieces 5 and 6 are provided with slots 13 and 14 which form teeth 15 and 16 on the pole piece 5 and teeth 17 and 18 on the pole piece 6. The respective teeth of the pole pieces 5 and 6 are aligned in the same manner as described for the teeth of the pole pieces 3 and 4.

Mounted between the stator pieces 1 and 2 in the air gap provided by the spacing of the pieces, are spaced armature segments 19 and 20. The armature segments 19 and 20 may be constructed from any desirable magnetic material and will usually be made of laminated iron depending upon design. The segments 19 and 20 are dimensioned so as to permit free linear movement between the poles of the stator pieces so as to obtain the minimum air gap between the segments and adjacent pole teeth. As indicated by the dotted line between the armature segments, they are mounted in fixed relationship with one another and may be mounted in any type of non-magnetic frame comprising an armature assembly, not shown, to maintain the spacing. The armature assembly necessarily has some mass which includes the weight of the armature segments, any frame or supports for the segments, the suspension system for the armature assembly and associated parts. For the armature to oscillate at some frequency will require accelerating forces to bring the armature up to velocity, then decelerate it and reverse it at the end of the stroke. Where the mass of the armature is relatively small, the accelerating forces may be small and may be supplied by the electro-magnetic action. These forces must be sufficient for both acceleration and to do useful work. In the event of larger masses (armatures having more weight) the accelerating forces required may be in excess of the magnetic forces available. In this instance, it is desirable to use a suspension system employing an elastic medium with such characteristics as to permit the armature unit to oscillate at its natural period of mechanical frequency commonly known as resonant frequency. In the present instance, such elastic medium may be provided by a simple spring suspension system indicated by the springs 19a and 20a which may be secured to any convenient part of the stator frame in order top rovide the necessary acceleration to permit oscillation at the resonant frequency. Any such spring suspension may be provided and will be well within the skill of those versed in the mechanical arts.

With further relation to the spacing of the armature segments 19 and 20 reference will be made to the spacing between armature segments as meaning the distance between the vertical center lines of the segments as shown in FIGS. 1, 2 and 3. In order to obtain the alternate flux transfer within the pole pieces of the present motor which is essential in obtaining the unique long-stroke action, the distance between vertical center lines of the armature segments must bear a definite relationship to the distance between the vertical center lines of the pole pieces 3, 4, 5 and 6. In all embodiments of the present invention, it is essential that the distance between vertical center lines of the armature segments be one tooth width less or greater than the distance between the vertical center lines of the pole pieces. The embodiment in FIGS. 1, 2 and 3 employs a spacing of the armature segments of one tooth width less than the distance between center lines of the pole pieces. This spacing provides that, as the armature segments move from left to right as shown in FIGS. 1 through 3, transfer of magnetic flux occurs "alternately" across conductors in the slots of the left pole pieces and right pole pieces. The flux transfer will be presently described in detail.

The magnetic circuit is established between the poles of the stator pieces by means of the field coils 21 and 22 located about the poles 3 and 6 respectively and the field coils 23 and 24 located about the poles 4 and 5 respectively. With the direction of current in the field coils as illustrated in the drawings, the magnetic flux flows between the stator pieces in the counter clockwise direction as idicated by the flux lines in FIGS. 1 through 3. This relationship will be well understood by those skilled in the electro-magnetic arts and it will be understood that D.C. current flows in all of the field coils and the unidirectional current may be obtained from either a direct current source or a rectified alternating current source of power.

A first alternating current energizing coil 25 is located in the slots 7 and 14 of the poles 3 and 6 and a second alternating current energizing coil 26 is located in the slots 8 and 13 of the poles 4 and 5, respectively. The upper coil 25 and the lower coil 26 are connected with like polarity to the alternating current supply so that the current in conductors in the pole pieces 3 and 4 flows in the same direction and likewise with conductors in the pole pieces 5 and 6. With the stator pieces 1 and 2 rigidly fixed and by suspending the armature segments 19 and 20 so as to move in a plane perpendicular to the axes of the pole pieces, the forces produced by an alternating current in the energizing coils 25 and 26 will (first) divert the magnetic flux alternately from one side to the other of the pole pieces, (second) produce forces alternately from right to left which will (third) cause the armature segments to oscillate to the right and left of the center or rest position shown in FIG. 2.

As aforementioned, the spacing of the armature segments 19 and 20 in the present embodiment is one tooth width less than the spacing between the center lines of the pole pieces in order to obtain the increased stroke desired and in order to provide for the "alternate" flux transfer in the pole pieces. It is important also to note that each armature segment extends the width of one tooth plus the width of the adjacent slot. As aforementioned, the same results may be obtained by increasing the armature segment spacing by the width of one tooth greater than the distance between the center lines of the pole pieces. Thus the armature segments register with the pole piece teeth at different times during the stroke and therefore the transfer of flux across the energizing conductors, i.e. from one tooth to the other, occurs at different times. Following through one stroke of the oscillating motor as illustrated in FIGS. 1, 2 and 3, FIG. 1 shows the armature unit or assembly in the left position where the magnetic flux flows in the left teeth of all pole pieces. The polarity is illustrated in FIG. 1 so as to produce thrust in the right hand direction. During the time the armature moves through the first half of the stroke (FIG. 1 to FIG. 2) the flux is transferred within the left pole pieces from the left teeth to the right teeth as shown in FIG. 2. No change of flux has occurred within the right pole pieces during the first half of the stroke and the armature is in the rest or balanced position. During the second half of the stroke (FIG. 2 to FIG. 3), flux is transferred within the right pole pieces from the left teeth to the right teeth. No change of flux occurs within the left pole pieces during the second half of the stroke. It should be noted that transfer of flux across conductors or from tooth to tooth takes place uniformly throughout the stroke even though it occurs "alternately" within the left poles then the right poles, likewise thrust is exerted "alternately" upon the left armature segment 19 and then on the right armature segment 20.

It may be mentioned that for operation on alternating current and under a theoretical no load condition the rest or centered position of the armature would coincide with theoretical zero current in the energizing conductors. Under loaded conditions the alternating current will, of course, be out of phase with the displacement of the armature segments so that reversal of current will not occur at the rest or centered position of the segments as shown in FIG. 16.

The present oscillating motor with the offset armature segments produces twice the stroke as would occur with the spacing of the armature segments being equal to the distance between the center lines of the pole pieces, and assuming that stator dimensions are equal. In the case of the present invention, the stroke is two times the width of a tooth whereas in the instance of equal spacing of the pole piece center lines and the armature segments, the stroke is the distance of one tooth only. Assuming identical stator and other quantities being equal, it should be noted that because the transfer of flux in the present invention occurs "alternately" about one armature segment at a time, the thrust exerted upon the armature is one half of the value developed in the equal spacing type of arrangement mentioned. Since the horsepower output is proportional to the product of thrust and stroke, the oscillating motor of the present invention, with half the thrust and twice the stroke, produces the same output as the equal spacing type of unit mentioned. The present oscillating motor also produces continuous flux transfer and hence generates a voltage or back E.M.F. proportional to armature velocity. When oscillation is simple harmonic motion, the generated voltage (or back E.M.F.) is of sine wave form.

The principle of using the offset armature segments to produce "alternate" transfer of magnetic flux in the pole pieces to attain uniform transfer of flux throughout the stroke is a principle that can be used to expand the stroke of the present type of oscillating motor to practically unlimited values. Obviously longer strokes could be obtained simply by making the pole pieces wide, however, good overall design is attained only when the width of teeth slots can be kept to desirable dimensions. It is therefore advantageous to be able to use a wide pole piece as required for the desired stroke and at the same time use multiple slots (and teeth) to provide for suitable distribution of conductors and flux.

FIGS. 4 through 8 illustrate the various positions of a unit with pole pieces employing two slots per pole and an armature with segments offset by one tooth width less than the distance between center lines of the pole pieces to provide the "alternate" magnetic flux transfer arrangement. It is well to note at this point that it is essential that the width of the teeth be equal to the width of the slots, when more than one slot per pole is used, to provide uniform flux transfer throughout the strokes. This may be more easily understood by referring to the drawings 4 through 8, where the flux transfer progression is illustrated for the two slot form of the invention. For instance, when the armature moves from the position shown in FIG. 5 to the position shown in FIG. 6, the right armature segment moves the width of one tooth while the left segment moves the width of one slot. Following this pattern, where the width of the slots and teeth are equal, the width of the pole pieces may be extended indefinitely and still meet the above requirements.

The motor unit shown in FIGS. 4 through 8 includes the stator pieces 27 and 28 which are similar to the stator pieces 1 and 2 of the motor shown in FIGS. 1 through 3 in every respect except for the utilization of two slots in each pole piece of each stator piece. The left pole piece 29 of the stator 27 has slots 30 and 31 which form teeth 32, 33 and 34 and the right pole piece 35 of stator 27 is provided with slots 36 and 37 which form the teeth 38, 39 and 40. In a like manner, the left pole piece 41 of the stator 28 is provided with slots 42 and 43 which form teeth 44, 45 and 46 while the right pole 47 of the stator 28 is provided with slots 48 and 49 forming the teeth 50, 51 and 52. It will be understood, as explained for the embodiments of FIGS. 1 through 3, that the armature pieces 53 and 54 are provided with the necessary suspension means and an elastic medium for providing acceleration if such is desired. Each of the pole pieces is also provided with a field coil in the same manner as described for the embodiment of FIGS. 1 through 3 with two alternating current energizing coils being provided in the two sets of slots in each of the stator pieces as indicated in FIGS. 4–8.

Following now the operation of the armature segments through one stroke of the motor, and referring to FIGS. 4 through 8, when the armature moves toward the right from the position shown in FIG. 4 to the position shown in FIG. 5, the flux transfers from the left teeth 32 and 44 to the center teeth 33 and 45 of the left poles 29 and 41 of the stator pieces. The polarity is illustrated in FIG. 4 so as to produce thrust in the right hand direction. No change takes place in the right hand poles as indicated in FIG. 5. As a motor, thrust is exerted on the left segment 53 during this period and a back E.M.F. is generated in the conductors in the slots 30 and 42. As the armature moves from the position in FIG. 5, flux is transferred from the left teeth 38 and 50 to the center teeth 39 and 51 of the right pole pieces 35 and 47. No change takes place in the left pole pieces. Similarly flux transfer occurs "alternately" within the left and right pole pieces throughout the entire stroke irrespective of the number of teeth and slots traversed. Since all energizing conductors in the upper poles are connected in series, the terminal voltage is continuous even though it is induced "alternately" in a conductor in the left pole piece and a conductor in the right pole piece as the armature moves continuously in one direction. Similarly, thrust is exerted "alternately" upon the left armature segment then on the right segment providing a continuous thrust throughout the stroke.

Those familiar with the art will recognize the term "slot pitch" as commonly used in electrical machinery design which represents the distance between center lines of adjacent slots. A synonymous term "tooth pitch" (tooth center line spacing) may be used with reference to the present invention and is equal to the slot pitch. The device illustrated in FIGS. 4 through 8 shows an "alternate" form of unit with a stator using two slots per pole and an armature with segments of width equal to the slot pitch. With "P" representing the slot pitch, this type of armature is hereinafter referred to as a one pitch (1–"P") armature. In FIG. 6 the armature is shown in the rest position and during operation the armature moves a distance of one slot pitch to the left and to the right of the rest position thus providing a stroke of two times the slot pitch or 2–P.

A modification of the present device with a stator employing two slots per pole and an armature of two slot pitch (2–P) segments is illustrated in schematic form in FIGS. 9, 10 and 11. This unit is the same in all respects as the unit shown in FIGS. 4 through 8 except for the difference in the armature segments designated as 55 and 56 in FIGS. 9 through 11. Identical reference numerals are used in FIGS. 9–11 to identify identical parts of the motor shown in FIGS. 4–8. Like the armature in FIGS. 4–8, the segments 55 and 56 are offset by one tooth width less than the distance between center lines of the pole pieces. The armature of this unit moves one half slot pitch to the left and to the right of rest position providing a stroke of 1–P. While the stroke is one half that provided by the one pitch armature shown in FIGS. 4 through 8, the thrust developed is twice as great. As also indicated in FIGS. 9 through 11, the two pitch (2–P) armature provides twice as many flux paths as in the case of the one pitch (1–P) armature shown in FIGS. 4 through 8. Since thrust is dependent upon the number of flux paths, the thrust is twice that produced by the one pitch armature. FIGS. 9 through 11 also illustrate the manner in which the flux transfer takes place when the one pitch armature is replaced with the two pitch armature.

Expanding the same geometric arrangement to three slots per pole piece, a total of three combinations of stroke and thrust are available from a single stator design as illustrated in FIGS. 12, 13 and 14. In FIGS. 12 through 14, the stator pieces, teeth and slot arrangements, field coils and energizing coils are all identical and identical reference numerals have been used.

In FIG. 12 the stator pieces 57 and 58 are provided with pole pieces 59, 60, 61 and 62. As illustrated, the pole piece 59 has three slots 63, 64 and 65 and likewise the pole piece 60 has three slots 66, 67 and 68. Pole piece 61 has slots 69, 70 and 71 and the pole piece 62 has slots 72, 73 and 74. The magnetic circuit is provided by a first field coil 75 about the pole piece 59, a second field coil 76 about the pole 60, a third field coil 77 about the pole piece 61 and a fourth field coil 78 about the pole piece 62. As shown in FIG. 12, the armature segments 79 and 80 are one pitch and the length of the stroke of the motor is three pitch distance.

FIG. 13 illustrates the same stator design as FIG. 12 but shows a two pitch armature having armature segments 81 and 82 providing a stroke of two pitch. FIG. 14 is the third possibility with the three slot stator design of FIG. 12 wherein the armature segments 83 and 84 form a three pitch armature with a stroke of one pitch. It will be understood, of course, that the stator design and armature arrangement shown in FIGS. 12 to 14 are all of the "alternate" form as previously described and may include an elastic suspension system.

As aforementioned, any of the embodiments discussed may be built with electro-magnets to establish the unidirectional magnetic field in the stator as shown in FIGS. 1 through 14 or may be built with permanent magnets to establish the field. The operation is the same in either case. For illustration, FIG. 15 shows a schematic diagram of an oscillating motor wherein the stator pieces 85 and 86 are each made up of identical pole pieces 87 with permanent magnets 88 and 89 being located between each pole piece of each stator piece. As shown in FIG. 15, each pole piece has two slots 90 with alternating current energizing coils being located therein. A one pitch armature segment arrangement is illustrated with the segments 91 and 92 being offset one tooth width. Permanent magnets may be substituted in all other combinations discussed in a similar manner to maintain a constant unidirectional magnetic field.

FIG. 16 is a graph of the phase relationship of the various significant characteristics of the motor of the present invention. With the armatures suspended to operate in harmonic motion and the energizing windings supplied from a power supply of commercial sine wave form, the line current $I_L$, line voltage $V_L$, magnetic flux linking the energizing coils $\varphi$, the armature displacement D, and the back E.M.F. or generated voltage E assume the phase relationship approximately as shown in FIG. 16. This drawing is for illustration only since the actual angle by which the line current lags the line voltage (which determines power factor) depends upon the particular design and also varies with the load. Also the angle by which the armature displacement lags the current varies with the load. The phase relationships shown apply generally to all the units whether the magnetic field is established by electro-magnets or by permanent magnets.

It will be readily apparent to those skilled in the art of electrical motors and generators that the present invention provides novel and useful improvements in such devices. It is also to be understood that structures described and claimed herein apply equally to electrical generators as well as motors. The arrangements and types of structural components utilized within the invention may be subjected to numerous modifications well within the purview of this invention and applicant intends only to be limited to a liberal interpretation of the specification and appended claims.

Having thus described the invention, what is claimed as new and desired to be secured by Letters Patent is:

1. In combination; a plurality of fixed magnetic pole pieces, each pole piece including at least one slot forming a plurality of teeth thereon, the slots and teeth of said pole pieces being substantially equal in width, an armature including separate armature segments adjacent each pole piece, each of said armature segments being of at least one tooth pitch in width, means to establish a unidirectional magnetic circuit of essentially constant magnitude between said poles and through said segments, said armature segments being so positioned relative to said teeth as to maintain a reluctance of essentially constant magnitude between the poles and the armature during oscillation, means to support said armature for oscillation, and alternating current conductors in said slots, the center line spacing of said armature segments differing from the center line spacing of said pole pieces by the width of one tooth, whereby alternating current applied to said conductors will divert magnetic flux from one tooth to the other alternately in one pole and then the other to apply thrust on one segment and then the other throughout the stroke so as to move said armature alternately in opposite directions.

2. The device according to claim 1 wherein; the center line spacing of said segments is one tooth width greater than the center line spacing of the pole pieces.

3. The device according to claim 1 wherein; the center line spacing of said segments is one tooth width less than the center line spacing of the pole pieces.

4. An oscillating motor comprising; spaced stator members, each of said stator members including parallel pole pieces, the respective pole pieces of said stator members being in substantial alignment with air gaps therebetween, at least one slot in each pole piece forming a plurality of teeth, the slots and teeth of respective aligned pole pieces being in alignment and the width of the slots being substantially equal to the width of the teeth, an armature including separate armature segments of at least one tooth pitch in width located in each air gap between aligned pole pieces, the center line spacing of said armature segments differing from the center line spacing of said pole pieces by the width of one tooth, means to establish a unidirectional magnetic circuit of essentially constant magnitude through said aligned pole pieces and said segments, said armature segments being so positioned relative to said teeth as to maintain a reluctance of essentially constant magnitude between the poles and the armature during oscillation, means to support said armature for oscillation, and alternating current conductors in said slots, whereby diversion of magnetic flux from one tooth to another alternately in one pole and then the other is produced to apply thrust on said armature segments alternately throughout the stroke to move said armature alternately in opposite directions.

5. The oscillating motor according to claim 4 wherein, each of said pole pieces is provided with two slots forming three teeth thereon, and each segment is substantially equal in length to the distance between center lines of adjacent teeth.

6. The oscillating motor according to claim 4 wherein, each of said pole pieces is provided with two slots forming three teeth thereon, and each segment is substantially equal in length to twice the distance between center lines of adjacent teeth.

7. The oscillating motor according to claim 4 wherein, each of said pole pieces is provided with three slots forming four teeth thereon, and each segment is substantially equal in length to the distance between center lines of adjacent teeth.

8. The oscillating motor according to claim 4 wherein, each of said pole pieces is provided with three slots forming four teeth thereon, and each segment is substantially equal in length to twice the distance between center lines of adjacent teeth.

9. The oscillating motor according to claim 4 wherein, each of said pole pieces is provided with three slots forming four teeth thereon, and each segment is substantially equal in length to three times the distance between center lines of adjacent teeth.

References Cited

UNITED STATES PATENTS

| 1,991,952 | 2/1935 | Murphy | 310—28 X |
| 2,444,134 | 6/1948 | Hittson | 310—30 |
| 2,668,251 | 2/1954 | List | 310—28 |
| 2,769,103 | 10/1956 | Kristiansen | 310—30 |
| 3,119,940 | 1/1964 | Pettit et al. | 310—24 |

OTHER REFERENCES

IBM Technical Disclosure Bulletin, vol. 16, No. 9, February 1964, pp. 19–20.

MILTON O. HIRSHFIELD, *Primary Examiner.*

D. F. DUGGAN, *Assistant Examiner.*